US012667122B2

(12) United States Patent
Wei

(10) Patent No.: US 12,667,122 B2

(45) **Date of Patent: *Jun. 30, 2026**

(54) TASTE-MODULATION OF COOLING AGENTS IN BEVERAGES

(71) Applicant: Edward T. Wei, Berkeley, CA (US)

(72) Inventor: Edward T. Wei, Berkeley, CA (US)

( * ) Notice: Subject to any disclaimer, the term of this patent is extended or adjusted under 35 U.S.C. 154(b) by 938 days.

This patent is subject to a terminal disclaimer.

(21) Appl. No.: 17/803,480

(22) Filed: Jul. 28, 2022

(65) Prior Publication Data

US 2023/0210141 A1 Jul. 6, 2023

Related U.S. Application Data

(63) Continuation-in-part of application No. 16/501,056, filed on Feb. 14, 2019, now Pat. No. 11,406,649.

(51) Int. Cl.

*A23L 2/56* (2006.01)
*A23F 5/48* (2006.01)
*A23L 2/60* (2006.01)

(52) U.S. Cl.

CPC ................ *A23L 2/56* (2013.01); *A23F 5/483* (2013.01); *A23L 2/60* (2013.01)

(58) Field of Classification Search

None

See application file for complete search history.

(56) References Cited

U.S. PATENT DOCUMENTS

2020/0171058 A1* 6/2020 Wei ......................... A61P 11/14
2020/0323774 A1* 10/2020 Labbe ..................... A61P 11/00

OTHER PUBLICATIONS

O'Donnell, Kay. "Aspartame, Neotame and Advantame." Sweeteners and sugar alternatives in food technology (2012): 117-136. (Year: 2012).*

* cited by examiner

*Primary Examiner* — Bethany P Barham
*Assistant Examiner* — Peter Anthopolos
(74) *Attorney, Agent, or Firm* — The Sun IP Law

(57) ABSTRACT

A beverage is a drinkable liquid. Described here is a beverage containing a cooling agent that will exert cooling sensations in the upper center of the chest and make a subject feel comfortable. The cooling agent is an agent that targets TRPM8 receptors on nerve cell membranes. The beverage can be imbibed without unpleasant taste and the goal is to make the whole body feel cooler for about 20 min or more after drinking. By choosing the right molecule and right concentration, cooling intensity, location, and duration in the chest is controlled. Surprisingly, the cooling agent was also effective when consumed with warm or hot beverages. The beverage contains selected 1-diisopropyl-phosphinoyl-alkanes and taste-modulating agents selected from sweeteners, extracts from hops, ginger, or cinchona. Various uses of this cooling beverage are proposed.

2 Claims, 6 Drawing Sheets

7MBV, TRPM5 7LQY, TRPV1 6BPQ, TRPM8

TASTE-MODULATION OF COOLING AGENTS IN BEVERAGES

CROSS-REFERENCE TO RELATED APPLICATIONS

Figure 1:
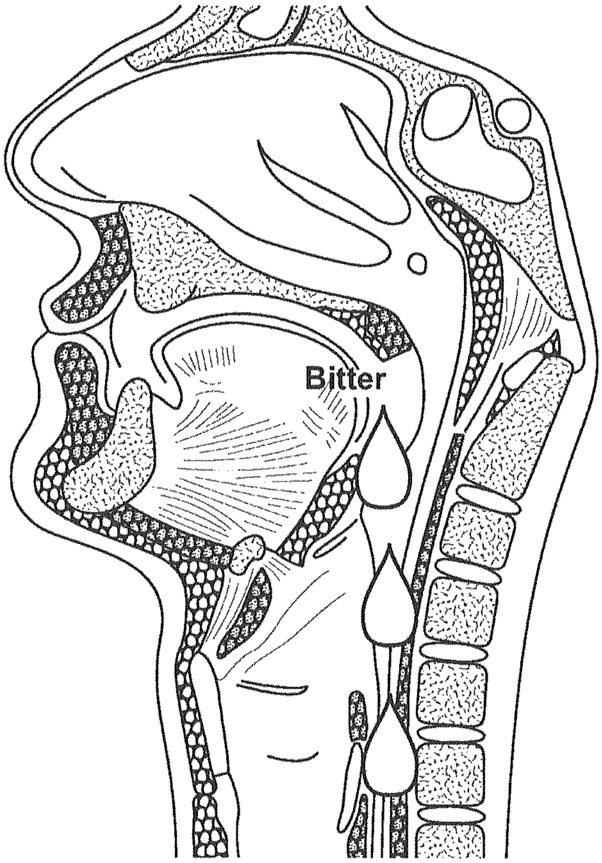

This application is a continuation-in-part of U.S. application Ser. No. 16/601,056, filed on Feb. 14, 2019, which has received a Notice of Allowance on Apr. 15, 2022.

BACKGROUND OF THE INVENTION

A cooling agent is a chemical that, without modifying body temperature, can convey sensations of coolness and refreshment upon contact with the skin or mucous membranes. The most familiar example of a cooling agent is menthol. In a classical set of studies, H. R. Watson and David Spring, Journal of the Society of Cosmetic Chemist, Vol. 29, p 185-200, 1978 described various chemical entities that produced sensations of coolness when applied to body surfaces such as the skin and the aerodigestive tract. WS-23, WS-3, WS-5, and WS-12 (WS for Wilkinson Sword) are p-menthane carboxamides used in confectionery, toiletries, and comestibles. Examples include chewing gum and toothpaste, shaving lotions, deodorants, face creams, shampoos, and toilet soaps. A beverage is a drinkable liquid. Cooling agents are not routinely used in beverages, although several patents or patent applications (Sinyakov, 2018; RU 7, 237, 172, C2; Bardsley et al., 2010, EP 2,246,232 A1; Luo et al., 2007; EP 2,079,321 B1) have suggested the use of WS-3, WS-23 and (2S, 5R)-N-[4-(2-Amino-2-oxoethyl) phenyl]-5-methyl-2-(propan-2-yl)cyclohexanecarboxam] for beverages. The need for a cooling agent in beverages is recognized, but this idea has not yet become a common reality.

The studies of Julius and Patapoutian (Nobel Laureates, 2021), about 20 years ago, revolutionized our understanding of temperature perception. These scientists identified TRPM8 as an integral membrane protein that transduces the sensations of coolness. Substances that produce cooling enhance the activity of TRPM8 on nerve endings. As temperatures drop below 22 to 25° C., TRPM8 becomes turned on, like a mini-air conditioner. Coolants do not directly block the detection of heat. Instead, the nerve cables that transmit heat and cold signals are modality-specific. This new information on TRPM8 forms an improved scientific rationale for finding a cooling agent for use in beverages.

BRIEF SUMMARY OF THE INVENTION

TRPM8 are integral membrane proteins on the cell membrane of neurons, and the neuron's receptive fields mediate the perception of cooling. TRPM8 is in the oral cavity, nasal cavity, pharynx, and esophagus, where agonists, such as the afore-mentioned WS compounds, can produce refreshing cool. The TRPM8 targets are on lips, gums, beneath the tongue, the buccal wall, and the fauces in the mouth. The skin of the tip of the nose and the respiratory epithelium of the nasal cavity have TRPM8. In the pharynx TRPM8 mediates cooling in the nasopharynx, oropharynx, and hypopharynx. Thus, mouth coolants used in toothpaste, mouthwash, candy, or chewing gum target TRPM8 receptors, and the smoke of mentholated cigarettes target receptors in the throat. The oropharynx is the target for a smoothie, popsicle, or ice cream. However, the anatomic target for a whole-body beverage coolant has not been pinpointed or identified.

Surprisingly, the applicant has found a set of compounds that will make a cool drink feel colder, and a warm or hot drink feel cool. Thus, the addition of such compound to a beverage will make warm beer and hot coffee taste cool! Such chemically-induced cooling in a beverage has not been previously described.

The applicant proposes that these whole-body beverage coolants, called DIPA, act on critical TRPM8 target nerve endings located in the lumenal surface of the hypopharynx and the upper esophagus. The nerve endings here sense core body temperature. The external landmarks for these target sites are Adam's apple (voicebox), jugular notch, and the manubrium (mid-point of the chest), not the oral cavity or tongue.

The applicant has an inventory of cooling agents that are water-soluble, potent, stable, and may be considered for use to enhance the cooling sensations of a beverage. These molecules are first in class and have superior properties to the p-menthane carboxamide WS compounds described previously. The preferred embodiments of this invention are compounds known as DIPA-1-5, DIPA-1-6, DIPA-1-7, DIPA-1-8, and DIPA-1-9. The DIPA compounds exert an icy, cold, or cooling sensation that can relieve heat discomfort. These chemicals are liquids in their natural state with a density slightly less than water. The unusual water-solubility of DIPA in a beverage allows it to reach targets in the hypopharynx and esophagus whilst minimizing contact with receptors in the oral cavity and upper pharynx. These compounds can make a cool drink feel colder, and surprisingly, even a warm or hot drink feel cool.

Ideally, a coolant for use in a beverage should have these properties:

- Water solubility, and hence complete miscibility in the beverage
- Chemical stability in an aqueous solution
- Be non-toxic, and non-irritating, have potency and rapid onset, within minutes, and a reproducible and sufficient duration, In addition, the beverage should not have adverse taste. The first three criteria are met by the DIPA compounds. DIPA 1-5,1-6, and 1-7 have an immediate onset and a powerful cooling action in the chest. The effects of DIPA 1-8 and DIPA-1-9 are more long-lasting (Table 1). However, some of these compounds in the range of 0.1 to 0.5 mg/mL in a liquid have an unpleasant, somewhat bitter metallic taste that hinders use in a beverage. As a beverage, the cooling ingredient must pass over the surface of the tongue, and on the tongue are taste buds that sense bitterness (FIG. 1).

Surprisingly, the applicant has found that the adverse taste of the DIPA solutions is modulated by the ingredients of certain sweeteners, beer, non-alcoholic beer, tonic water with quinine, carbonated solutions, coffee, and decaffeinated coffee. For sweeteners, the plant extracts from *Siraitia grosvenoril* and *Stevia rebaudiana* are exceptionally effective in taste modulation. Sugar such as sucrose was also effective but are calorigenic and cariogenic. Artificial sweeteners containing Aspartic acid-Phenylalanine derivatives were effective, especially neotame, but other synthetic sweeteners such as sucralose and acesulfame-K have too much bad tastes. Heineken beer or Schweppes tonic water concealed the unpleasant taste of DIPA. One would have expected the adverse flavors of beer and tonic water, two drinks with bitter ingredients to be additive or potentiated. Instead, drinks containing the plant-derived substances in hops, cinchona bark, and coffee bean extracts made the DIPA palatable. Further studies revealed that drinks made with the ginger plant (*Zingiber officinale*), guarana plant (*Paullina cupana*), Concord grapes (*Vitis labrusca*) and grapes of the Muscat family, have exceptional qualities of modulating the taste of cooling agents and made them drinkable. The beverage with the coolant is now predictably ready for consumption with a prolonged cooling and refreshing experience at the center of the chest without unpleasant taste. Thus, taste modulation of the beverage makes it palatable.

From this discovery it is now possible to create a beverage that is drinkable and when imbibed makes the organism feel cool in a hot environment.

BRIEF DESCRIPTION OF THE SEVERAL VIEW OF THE DRAWINGS

FIG. 1. Shows the objective of the discovery, to deliver a beverage (via drops) down the pharynx and esophagus and to exert cooling, but also to minimize with a taste modulator any bitter taste of the beverage evoked from the posterior dorsal surface of the tongue.

Figure 2:
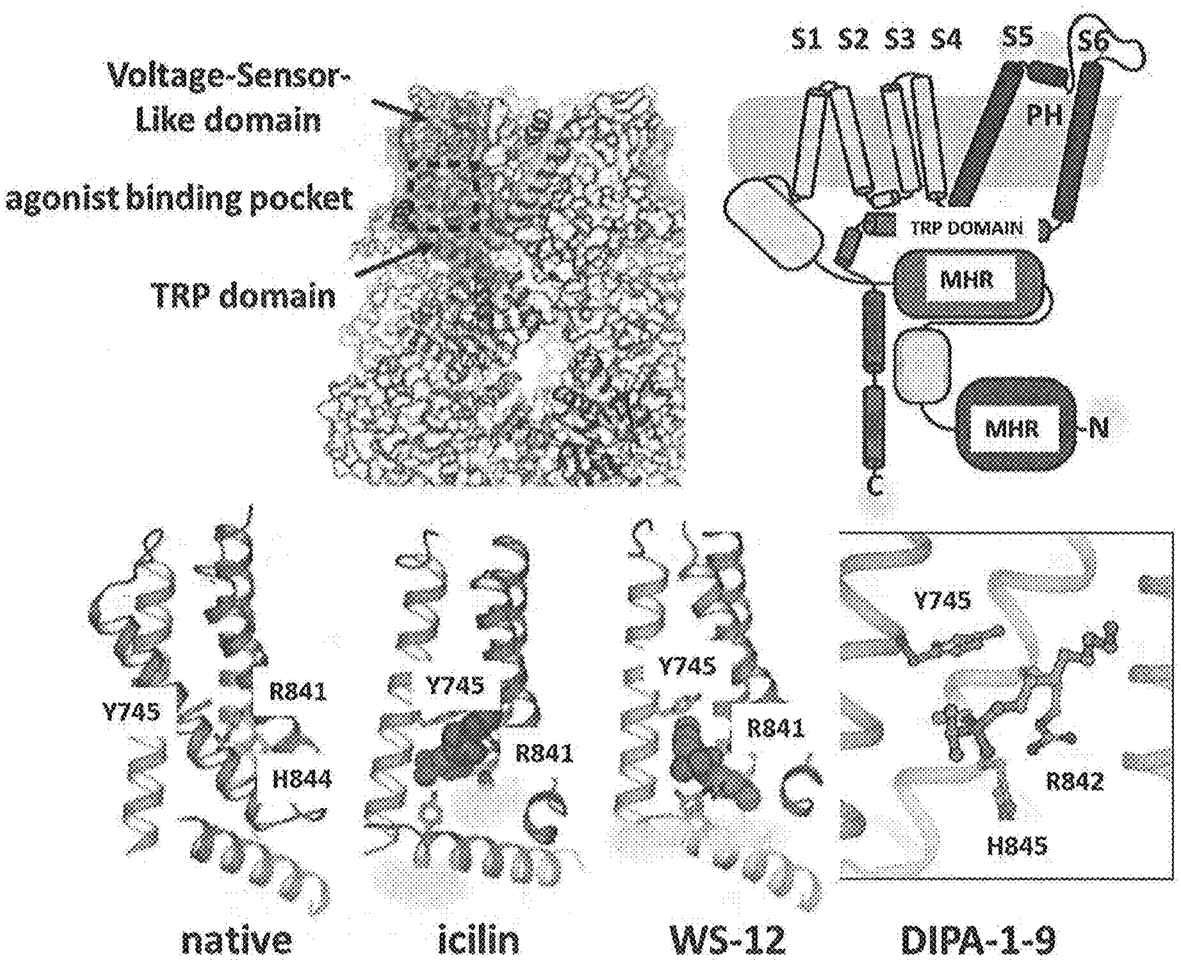

FIG. 2. Shows the physiological mechanism of cooling on the TRPM8 receptor. On the left panel is the extracellular surface of TRPM8 with the pore in the center for cation entry and neuronal depolarization. On the right panel, when temperature drops ≤5° C., it is as if a propeller is activated to allow cation entry into the pore. The site is called the orthosteric site. This 3-D cryo-electron microscopy model was created by Y. Yin and S. J. Lee at Duke University in 2019 and is available from www.rscb.com Protein Databank.

Figure 3:
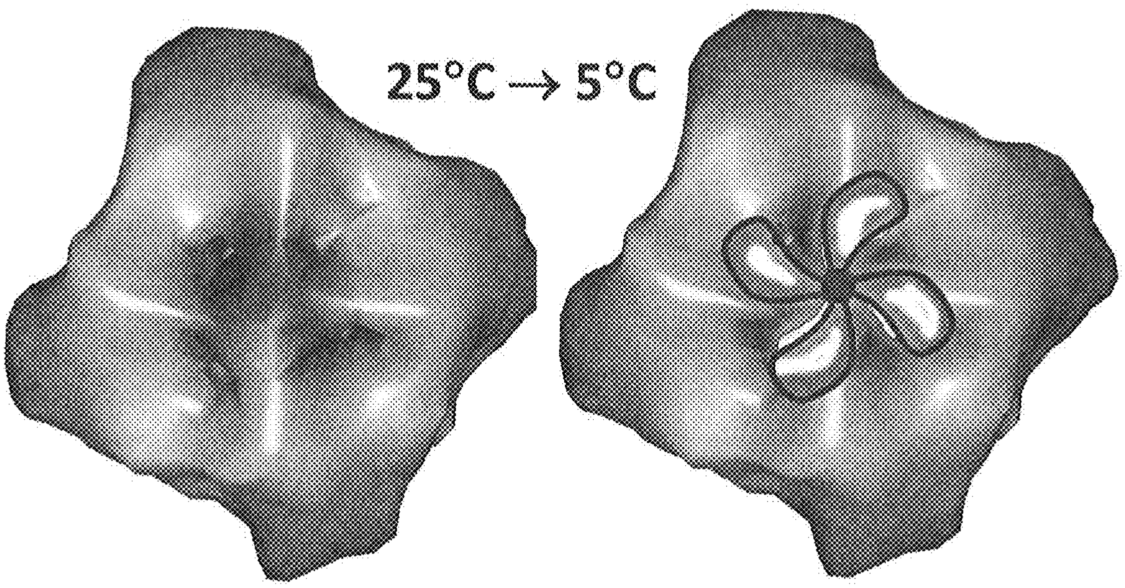

FIG. 3. Shows chemical activation of TRPM8 with a key at an allosteric site on the receptor. The binding site (lock) reacts to the agonist (key). The concept of "lock and key" was first proposed by Emil Fischer in late 19$^{th}$ century for enzyme-substrate interactions. Turning the key with a TRPM8 agonist revs up the propeller and can make hot beverages feel cool.

Figure 4:
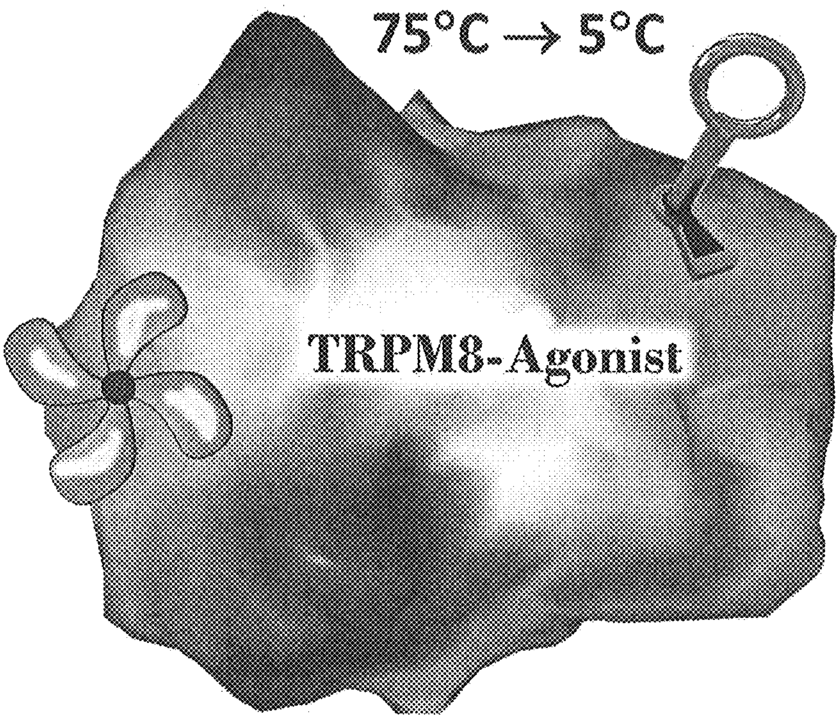

FIG. 4. Shows the molecular mechanism of TRPM8 activation. The agonist binding pocket is shown in the upper left panel. TRPM8 has six transmembrane loops in the cell membrane, labelled as S1 to S6. S1 to S4 contains the agonist binding pocket. The pore helix (PH) between S5 and S6 detects the physical change of temperature. The allosteric binding sites are in the binding pocket and have essential amino acid residues Y(tyrosine) 745 and R(arginine) 842 that bind to the agonist. The binding sites of three cooling agents, icilin, WS-12 and DIPA-1-9 have been identified using cryo-electron microscopy. MHR are melastatin homology regions. N is the amino terminus of the protein and C the carboxyl terminus (Yin, Y. and Lee, S. Y. (2020). Current View of Ligand and Lipid Recognition by the Menthol Receptor TRPM8. Trends Biochem. Sci., 45(9), 806-819. https://doi.org/10.1016/j.tibs.2020.05.008).

Figure 5:
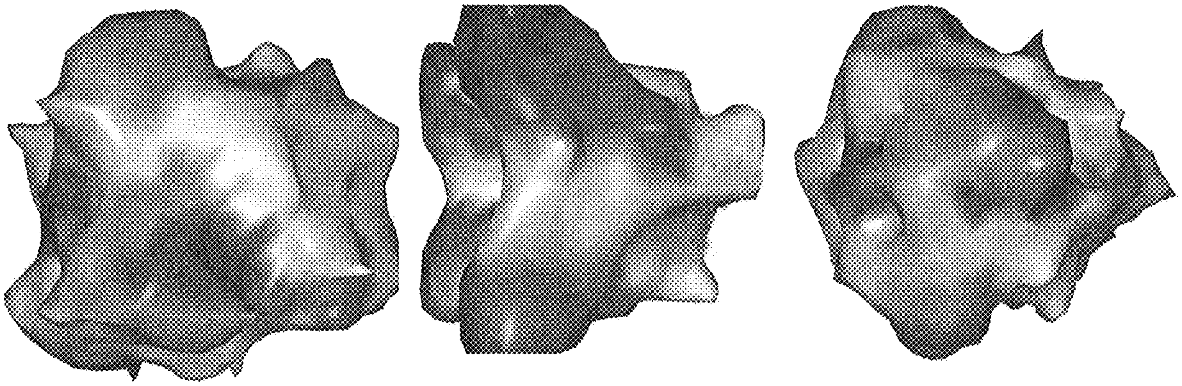

FIG. 5. Shows the structural homology of TRP family receptors. These TRP receptors have six transmembrane domains. Note that *Stevia* glycosides stimulate TRPM5, and ginger tastants stimulate TRPV1. *Stevia* glycosides and ginger inhibit the bitter tastes of DIPA. The codes 7MBV, 7LQY, and 6BPQ refer to the codes for these cartoons in the rscb Protein Database.

Figure 6:
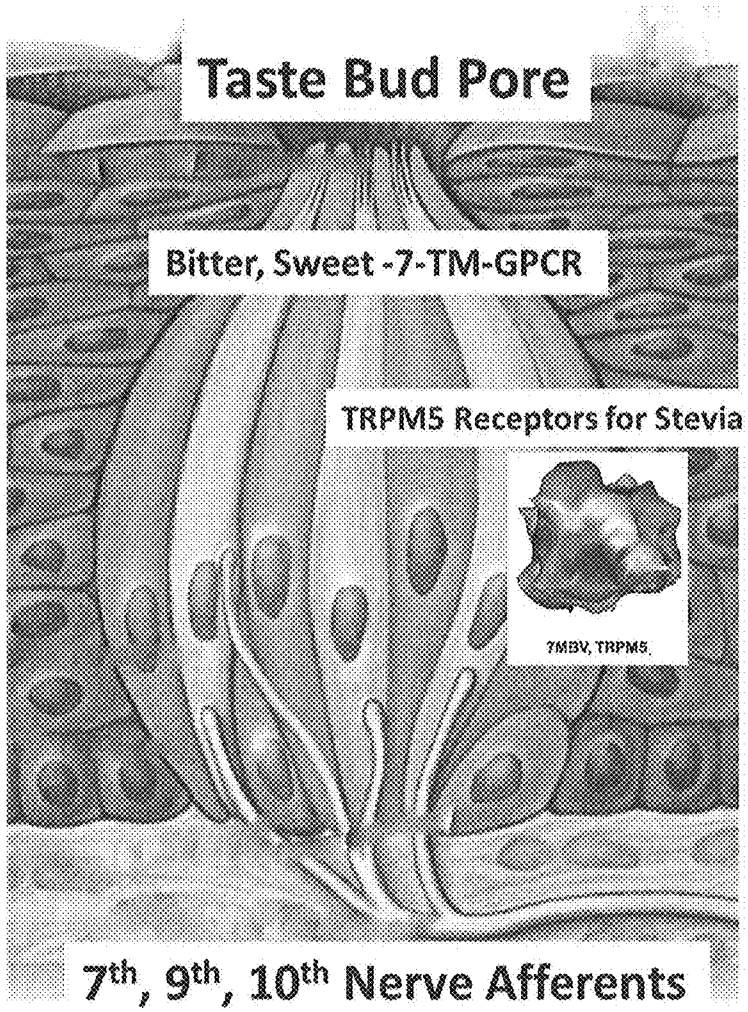

FIG. 6. Shows a diagram of taste bud mechanisms for detecting bitter tastants. The five tastes that are specifically coded are sweet, sour, salty, bitter and umami. Tastants activate receptors called G-Protein-Coupled Receptors that have 7-transmembrane loops. Activation of the taste receptor cells results in release of ATP which in turn activate purinergic receptors and generate neuronal signals carried in the 7$^{th}$, 9$^{th}$, and 10$^{th}$ cranial nerves

DETAILED DESCRIPTION OF THE INVENTION

DIPA and DAPA Compounds The discovery relates to compounds within the series of compounds known as phosphine oxides (which have the following general formula), and more particularly, an example of the group known as di-alkyl-phosphinoyl-alkanes (herein referred to as "DAPA compounds") (wherein each of $R_1$, $R_2$, and $R_3$ is an alkyl group).

$$(O{=})P\ R_1R_2R_3$$

When two alkyl groups are diisopropyl, the compound is called DIPA. Note that the pentavalent phosphorus may be called either a phosphinic acid or a phosphoric acid, and the derivatives are called phosphinoyl- or phosphoryl-. The current IUPAC nomenclature prefers phosphoryl-, but in earlier applications, we used phosphinoyl-, so we will keep this terminology. The two terms, diisopropylphosphinoyl- and diisopropylphosphoryl- are interchangeable. One particular 1-diisopropyl-phosphinoyl-alkane (DIPA), 1-Diisopropyl-phosphinoyl-nonane, referred to as "DIPA-1-9", is of specific interest and shown in Table 1.

TABLE 1

Chemical structure of DIPA-1-9

| Code | Chemical Name | Formula/ Weight | Chemical Structure |
|---|---|---|---|
| DIPA-1-9 | 1-Diisopropyl-phosphinoyl-nonane | $C_{15}H_{33}OP$ 260.40 | 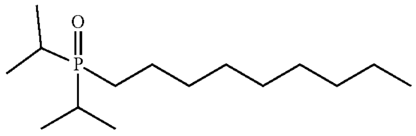 [SMILES: CCCCCCCCCP(=O)(C(C)C)C(C)C] |

DIPA compounds are colorless liquids at room temperature, with a density of ~0.84 to 0.92 g/cm$^3$ and a boiling point of 112-120° C. Note that DIPA compounds are achiral and do not have enantiomers. The applicant has identified DIPA-1-9 as an exceptional agent for treating sensory discomfort from the mucous membranes of the upper digestive tract compared to other analogs. Topical administration of DIPA cools the nasal cavity, oropharynx, and ocular surface (U.S. Pat. Nos. 9,642,868 and 9,895,382). The receptor on neuronal membranes for DIPA is TRPM8, an ion channel. Optimized analogs do not produce stinging or "icy cold" when the unit dose is below 20 mg.

Chemical Synthesis: The general method for making DAPA was: 100 mL (23.7 g, ~200 mmol) of sec-butylmagnesium chloride or bromide (isopropylmagnesium chloride or bromide) (obtained from Acros, as a 25% solution in tetrahydrofuran (THF) was placed under nitrogen in a 500 mL flask (with a stir bar). Diethyl phosphite solution in THF (from Aldrich, D99234; 8.25 g, 60.6 mmol in 50 mL) was added dropwise. After approximately 30 min, the reaction mixture warmed up to boiling. The reaction mixture was stirred for an extra 30 min, followed by a dropwise addition of the appropriate n-alkyl iodide solution in THF (60 mmol in 20 mL). In the case of DIPA-1-9, the n-alkyl halide was 1-iodononane. The reactive mixture was then stirred overnight at room temperature. The reaction mixture was then diluted with water, transferred to a separatory funnel, acidified with acetic acid (~10 mL), and extracted twice with ether. The ether layer was washed with water and evaporated (RotaVap Buchi, bath temperature 40° C.). The light brown oil was distilled under a high vacuum. The final products, verified by mass as determined by mass spectrometry, were liquids that were colorless or slightly pale yellow. The compounds prepared by these methods are in Table 2.

TABLE 2

Examples of Chemicals prepared and tested.

| Code | Chemical Name | Chemical Structure |
|---|---|---|
| DIPA-1-5 | 1-Di(isopropyl)-phosphinoyl-pentane | 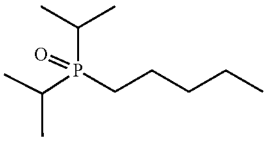 |
| DIPA-1-6 | 1-Di(isopropyl)-phosphinoyl-hexane | 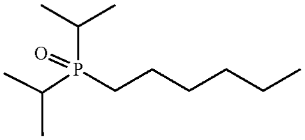 |
| DIPA-1-7 | 1-Di(isopropyl)-phosphinoyl-heptane | 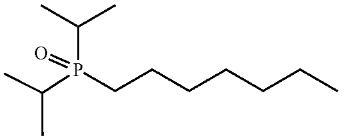 |
| DIPA-1-8 | 1-Di(isopropyl)-phosphinoyl-octane | 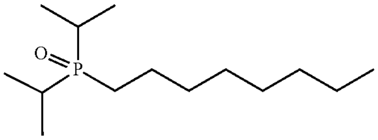 [SMILES: CCCCCCCCP(=O)(C(C)C)C(C)C] |
| DIPA-1-9 | 1-Di(isopropyl)-phosphinoyl-nonane | 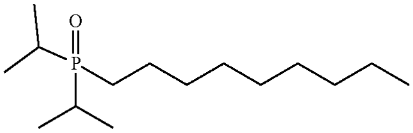 [SMILES: CCCCCCCCCP(=O)(C(C)C)C(C)C] |
| DPA-2-4 | 1-Di(sec-butyl)-phosphinoyl-butane | 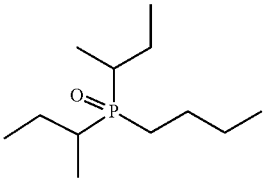 |
| DPA-2-6 | 1-Di(sec-butyl)-phosphinoyl-hexane | 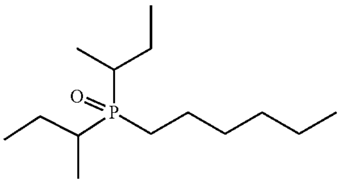 [SMILES: CCCCCCP(=O)(C(C)CC)C(C)CC] |
| DPA-2-7 | 1-Di(sec-butyl)-phosphinoyl-heptane | 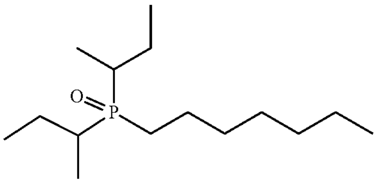 [SMILES: CCCCCCCP(=O)(C(C)CC)C(C)CC] |

TABLE 2-continued

| Examples of Chemicals prepared and tested. | | |
|---|---|---|
| Code | Chemical Name | Chemical Structure |
| DPA-2-8 | 1-Di(sec-butyl)-phosphinoyl-octane | 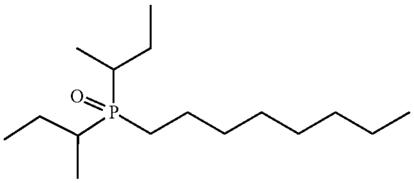 [SMILES: CCCCCCCCP(=O)(C(C)CC)C(C)CC] |
| 3,4-6 | 1-(Isopropyl-sec-butyl)-phosphinoyl-hexane | 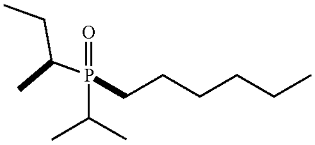 |
| 3,4-7 | 1-(Isopropyl-sec-butyl)-phosphinoyl-heptane | 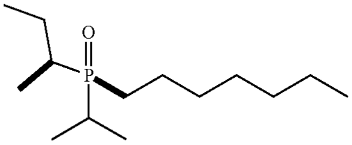 |
| DAPA-3-1 | 1-di(iso-butyl) phosphinoyl-pentane | 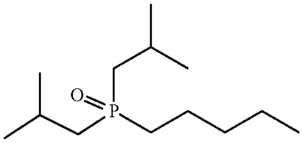 |
| DPA-3-2 | 1-Di(sec-butyl) phosphinoyl-3-methyl-butane | 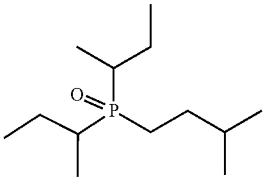 |

Compositions The 3,4-X series are "mixed" isopropyl-sec-butyl compounds (see below). These were synthesized by Dr. Jae Kyun Lim of Dong Wha Pharmaceuticals, using the method described below.

Briefly, as illustrated in the following scheme, triethyl phosphite (A) was reacted with sec-butyl magnesium bromide (B) and then hydrolyzed with dilute hydrochloric acid to give the mono-alkyl compound (C). The product (C) was then reacted with isopropyl magnesium bromide (D) to give the di-alkyl compound (E), which was then reacted with a suitable alkyl iodide (F) to give the target trialkyl phosphine (G).

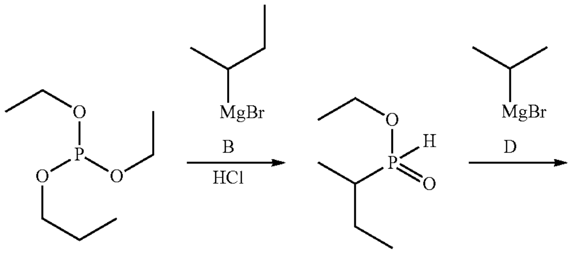

A C

-continued

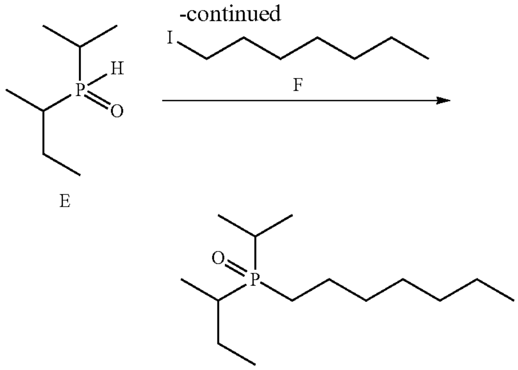

E G

The DIPA compounds are colorless liquids with a density less than water. These structures differ from those described by Rowsell and Spring U.S. Pat. No. 4,070,496 because '496 structures have their "head" (phosphine oxide group) covered by larger, more lipophilic groups. The applicant noted that '496 did not include the di-isopropyl analogs. The applicant synthesized these analogs (which are achiral, by contrast to the structures of '496, which are >95% chiral). The applicant found that, by minimizing the two alkyl side chains to di-isopropyl, the "head" of the prototypical molecule now is more polar (hydrophilic) and more miscible in the polar environment of water. This increased water-solubility is striking (Table 3). Additional details on the bioactivity and pharmacology of these DIPA can be found in the paper by Yang et al., [(2017). A novel TRPM8 agonist relieves dry eye discomfort. BMC Ophthalmology, 17(1). https://doi.org/10.1186/s12886-017-0495-2], incorporated herein by reference. The median effective dose of these structures on the TRPM8 receptor are shown in Table 10.

TABLE 3

Water solubility (mg/ml) of 1-dialkylphosphorylalkanes ($R_1R_2R_3P{=}O$).

| | No. Carbons | | | | | | | |
|---|---|---|---|---|---|---|---|---|
| | 13 | | 14 | | 15 | | 16 | |
| $R_1$, $R_2$ | $R_3$ | | $R_3$ | | $R_3$ | | $R_3$ | |
| di-sec-butyl- | pentane | 22 | hexane | 8 | heptane | <3 | octane | <3 |
| isopropyl-sec-butyl- | hexane | 25 | heptane | 20 | octane | <3 | nonane | <3 |
| di-isopropyl- | heptane | >300 | octane | >300 | nonane | >300 | decane | <3 |

In one embodiment, the beverage composition comprises DIPA compounds at a concentration of 0.01 to 0.5% wt/wt (0.1 mg to 5 mg/mL). A standard beverage container may contain 200 to 350 mL. But for a medicinal beverage, this can range from 30 to 100 mL. A preferred amount of the compound imbibed per ingestion is 10 to 50 mg.

One aspect of the present discovery pertains to DIPA used in a recreational beverage or a beverage adapted for certain forms of heat-related stress. In another formulation, the treatment method is treatment (e.g., targeted treatment) of certain disorders (e.g., diseases), as described herein. In one embodiment, the medicament comprises DIPA compounds.

Synthesis of 1-(Diisopropyl-phosphinoyl)-Alkanes

Like the DAPA compounds, the specific DIPA compounds of this discovery were synthesized in a one-pot procedure. Diethyl phosphite is reacted with an excess of iPrMgBr (3.3 eq.). Isopropyl groups substitute the two ethoxy groups, and the intermediate is deprotonated by the Grignard reagent so that it can be alkylated with 1-haloalkane to yield the final product. The 1-haloalkane can be a bromoalkane or an iodoalkane, but 1-bromoalkane is preferred because of availability and expense. The Grignard reagent was prepared in-situ from iPrBr and Mg.

Abbreviations and Terminology

DIPA compounds DIPA is the abbreviation for 1-[Diisopropyl-phosphinoyl]-alkane]. A number may describe the third alkyl group in the molecule: hence, 4, 5, 6, 7, 8, 9, and 10 correspond to the butyl, pentyl, hexyl, heptyl, octyl, nonyl, and decyl side chain, respectively. These alkanes are linear or "normal [n]" in configuration, with the phosphinoyl group attached to the primary, or "1-" position, of the carbon chain in the third sidechain. An alternative name for these compounds is trialkyl phosphine oxides or 1-dialkylphosphorylalkanes. As these compounds are derivatives of phosphinic acid or phosphoric acid, the terms "phosphinoyl" or "phosphoryl" are equivalent.

Esophagus. The esophagus is a muscular tube about eight to ten inches (25 cm) long that connects the hypopharynx to the stomach. The esophagus runs behind the windpipe (trachea) and in front of the spine. It extends from the cricopharyngeus muscle at the cricoid cartilage level to the stomach's entrance at the diaphragm. The esophagus at neck level has a width of about 1.5 to 2 cm which is 10% the diameter of the trachea. The esophagus is hard to discern among the blood vessels in the chest, but it is in the middle of the thorax.

Epigastric Region. The epigastric (above the stomach) region is the abdominal region that is central in location, above the umbilical region, and between the two hypochondriac regions. It is the triangular region below the xiphoid process. Reflux disease produces heartburn, a burning sensation originating from the epigastrium and radiating upwards to the throat and neck.

Hypopharynx is bottom part of the pharynx, the part of the pharynx that connects to the esophagus while the laryngopharynx is the part of the pharynx below and behind the larynx. The two terms are frequently used interchangeably. The hypopharynx begins at the level of the cricoid cartilage. In histology, the oropharynx and hypopharynx are similar.

Jugular Notch. A notch, also known as the suprasternal notch, is the visible external dip in the center of the neck in humans, between the collar bones (clavicles) and above the manubrium (hilt) of the sternum. The trachea lies just behind it.

Pharyngeal Transit Time (PTT) is the time between the arrival of the bolus tail at fauces and after the complete passage of the bolus tail through the upper esophageal sphincter. The average time is ≤1 sec and measured by videofluoroscopy (for example, see Regueiro et al. Influence of Body Height on Oral and Pharyngeal Transit Time of a Liquid Bolus in Healthy Volunteers. Gastroenterol Res. 2018; 11(6):411-5.]

Swallowing (deglutition) is a complex coordinated function wherein food and liquid move from the oral region to the stomach. The individual sensors and effectors for swallowing are well-described in a review by Miller [Developmental Disabilities Research Reviews: 2008: 14: 77-86].

Liquid Volume to Accompany Swallowing a Beverage. The reservoir volumes tested here were mainly from 15 mL to 330 mL. A teaspoon (5 mL) may also be used as an unit for delivery, especially for children or the elderly.

Tastant is any substance that stimulates the sense of taste. The tasting system consists mainly of taste receptor cells located in taste buds of the tongue [Suzuki T. Cellular mechanisms in taste buds. Bull Tokyo Dent Coll. 2007; 48:151-61]. The taste receptor system is connected to the brain by 7th, 9th and 10th cranial nerves. Tastants have to dissolve in liquids, e.g. saliva, before they activate the receptors. The main set of receptors for bitterness are G-protein receptors which have seven transmembrane domains. Bitterness is detected by Taste Receptor Type 2. The sweet taste receptor is on both Type 1 and Type 2 Taste Receptors. Other tastants activate ion channels such as TRPM5 (*Stevia* sweeteners). The tongue also detect salty, sour, and umami tastes in addition to sweet and bitter. Carbonated water may stimulate receptors for sourness.

Taste modulation occurs when a perceived taste's intensity is modified by a carrier when consumed with the flavor. This modulation can be either an amplification of the sensory signals, i.e. a taste enhancement, or the opposite response, a muting of the taste. The term taste-modulating is more often used when a undesirable flavor is muted. The term modulation is used here because in some instances the combination of a cooling agent with an ingredient such as ginger gives additional sensations which are more complex, e.g., a sense of hot and cold, which may be an attractive sensation for some drinkers.

TRP channels The transient receptor potential (TRP) family of cation channels are peripheral detectors of nociceptive, thermal, and painful stimuli. Many of these receptors are located on the nerve membranes of sensory neurons and respond to chemical irritants and changes in local temperature by activating nerve action potentials. The brain perceives and acts upon these signals. Thus, TRP receptors transduce sensory information, and this transduction system regulates and protects the organism from external irritants. The TRP channels participate in taste, e.g. the spiciness of chili is mediated by TRPV1, but tastants are usually are associated with G-Protein Coupled Receptors in the taste buds (TRPs in taste and chemesthesis. Vol. 223, Handbook of Experimental Pharmacology. 2014. Pp. 827-871. Simon, A. S., Ranier R. TRP Channels at the Periphery of the Taste and Trigeminal Systems. Neurobiol TRP Channels. 2019; 113-24).

Receptive field of a sensory neuron is the region in space in which a stimulus will modify the neuron's firing. The distribution of the nerve endings defines the receptive field. For the epithelium, the nerve endings interdigitate with the cell layers at the basal layer of the epithelium. A receptive field, even though minuscule in area, e.g., about an $mm^2$, when activated by the appropriate stimulus, e.g., nociceptive or pruritic, can dominate the attention of the brain and mind. Witness what happens when a sharp pin or sting comes into contact with skin or a dog is preoccupied with a flea bite.

*Stevia* sweeteners. A comprehensive list of the chemicals that make up the *Stevia* sweeteners are assembled in the paper by Younes, M. et al. (2020). Safety of a proposed amendment of the specifications for steviol glycosides (E 960) as a food additive: To expand the list of steviol glycosides to all those identified in the leaves of *Stevia rebaudiana* bertoni. EFSA Journal, 18(4), 1-32. https://doi.org/10.2903/j.efsa.2020.6106. Some of the sweeteners from the monk fruit plant are also glycosides.

Mechanisms of Action of Cooling of DIPA Compounds

Cooling is the sensation evoked from tissues when heat is abstracted. The signals of cooling are transmitted by nerve fibers and perception of cooling occurs in the brain. The cloning of TRP (for transient receptor potential) family of channels of sensory transmission revolutionized how we understand the neuronal circuitry of thermosensation and sensory discomfort. This work culminated in the Nobel award in 2021 to David Julius and Ardem Patapoutian, the pioneers in this research. Now specific TRP receptors coding for temperature may be visualized on nerve endings. The emerging view is that dedicated TRPM8 (M8 is melastatin 8) nerve fibers convey the signals of coolness. The sense of cooling (≤25° C. at the receptor) is anatomically and modality-specific, with its own favored circuitry and cables [Knowlton W M et al. A sensory-labeled line for cold: TRPM8-expressing sensory neurons define the cellular basis for cold, cold pain, and cooling-mediated analgesia. J Neurosci. 2013; 33(7):2837-48]. The TRPM8-mediated cooling counteracts dysesthesia. The neuronal pathways for cooling and dysesthesia need not directly overlap, but preferably originate from the same dermatome. Signals converge in the spinal cord or brainstem nuclei. Thus, for example, cooling signals from TRPM8 receptive fields in the esophagus can suppress discomfort in the thorax.

What is TRPM8? TRPM8 is an integral membrane protein first named in 2005 when IUPAC standardized the nomenclature of the TRP ion channel family [Clapham D E, Julius D, Montell C, Schultz G. International Union of Pharmacology. XLIX. Nomenclature and structure-function relationships of transient receptor potential channels. Pharmacol Rev. 2005; 57(4):427-50]. TRPM8 was discovered in the prostate epithelium in 2001, and in 2002 its thermosensor function on nerve endings was recognized. There is now an extensive library on TRPM8. At the molecular level, TRPM8 is a homotetramer with six transmembrane loops. Allosteric binding sites are on the first five loops, and the cation pore is between the fifth and sixth loops. Amino acid residues important for binding and function of TRPM8 structure were identified, and the 3-D structure was resolved by cryo-electron microscopy to less than 4 Ångstroms. When the temperature is ≤25° C., TRPM8 pores open up, and entry of cations across nerve endings triggers action potentials to the brain, signaling coolness from the specific receptive field. Chemical cooling agents such as menthol or icilin act on allosteric sites to facilitate the opening of TRPM8 pores. On the orthosteric sites, a drop in temperature directly activates the temperature-sensing element in the transmembrane 5 to 6 loop pore of TRPM8. The term "DIPA compounds" applies to chemicals that simulate cool without affecting tissue temperatures. TRPM8 nerve endings discretely aggregate in the body. There is a high innervation density in the nasal, corneal, eyelid margin, pharyngeal and esophageal surfaces.

TRPM8 Mechanism of Action in Beverages, in non-technical plain language. TRPM8 is a protein embedded in the cell membrane (FIGS. 2 to 4). In the center of this protein is a pore where ions can enter and discharge the cell if it is an excitable neuron. The standard driving force for coolness is a drop in temperature below 25° C. As shown in FIG. 2, heat abstraction turns on a "propeller," and cations enter and discharge the membrane and send a signal to the brain. We usually think of this air-conditioner being on only when the temperature drops ≤25° C. The cold-sensing element in TRPM8 is in a pore helix (PH) between transmembrane loops 5 to 6. This site is called orthosteric for temperature sensing. With chemical coolants, allosteric sites can turn on the propeller. The allosteric sites are like a lock and key, the cooling agent being the key and the lock being a specific "pocket" in TRPM8 (FIG. 3). Surprisingly, we have found that with the right key (DIPA), you can vigorously activate the propeller so that a warm beer (50° C.) or hot coffee (75° C.) will now feel cool! The beverage must pass over the tongue's surface to activate whole body coolness. However, the DIPA compounds have an unpleasant taste. Various substances can mask unpleasant tastes, especially monk fruit-derived sweeteners and the synthetic sweetener neotame. With an optimized masking agent, we have a DIPA-spiked beverage at room temperature that activates the sense of cooling for 15 to 45 min.

TRPM8 Mechanism of Action in Beverages, in technical language. TRPM8 is a homotetramer. The mouse, rat, and human monomer units have identical 1104 amino acid residues, and the receptor is an ion channel with six transmembrane domains, labeled as S1 to S6 in FIG. 4. The physiological temperature sensing element is likely a 35-peptide fragment in a pore helix between S5 and S6. This site for temperature sensing is called orthosteric. Cryoelectron microscopy has resolved the 3-D structure of TRPM8 to ≤4 Å. The allosteric site, dock, or binding pocket for the chemical coolants is shown as a "lock" in FIG. 4. The Y745 and R842 (or R841 for avian TRPM8) in the lock are essential amino acid residues for agonist binding. The standard coolness driving force at the orthosteric site is a drop to ≤25° C. FIG. 2 shows heat abstraction turns on a "propeller" at the orthosteric site, and cations enter and discharge the membrane. Signals of coolness are perceived. We detect this air-conditioner when the temperature drops ≤25° C. With chemical coolants, the allosteric site operates like a lock and key, a term used by Fischer to describe enzyme-substrate interactions and by Ehrlich to describe antibody-antigen binding. Surprisingly, these allosteric sites generate an agonist signal so powerful that warm beer (50° C.) or hot coffee (75° C.) now feel cool! For the beverage to activate coolness, it must pass over the tongue's surface. However, some coolants taste bad, an effect mediated by the tongue's taste buds. The sweet and bitter tastants link to G-Protein Coupled Receptors. Some plant sweeteners such as *Stevia* glycosides also activate TRPM5 receptors on taste cells [Philippaert, K. et al. Steviol glycosides enhance pancreatic beta-cell function and taste sensation by potentiation of TRPM5 channel activity. Nat Commun. 2017.DOI: 10.1038/ncomms14733]. Various compounds, especially the monk fruit plant-derived sweeteners and the synthetic sweetener neotame, mask the coolants tested here. With this knowledge, we now have a palatable DIPA-spiked beverage, hot or cold, that activates a sense of cooling for 15 to 45 min.

Neuronal Circuitry and Modality-Specific Transmission for TRPM8. Cloning of TRP channels enabled subsequent visualization of receptors on nerve endings. These results have led to the emerging view that dedicated TRPM8 nerve fibers convey the signals of coolness. The sense of cooling (≤25° C. at the receptor) is anatomically and modality-specific, with its own favored circuitry and cables. TRPM8-mediated cooling for the upper digestive tract can be called "cool esthesia." The TRPM8 neuronal pathways need not overlap with the cranial or somatic afferents transmitting irritative stimuli. TRPM8 receptive fields are present in the ocular rim, oral and nasal cavity, pharynx, esophagus, and anogenital tissues. When cooling signals converge with irritative signals at spinal or brainstem nuclei, the perception of irritation diminishes.

Target Sites and Drug Delivery The TRPM8 nerve endings infiltrate and embed in the basal epithelial layers. Dr. Wesley Norman elegantly illustrates the neuronal circuity of the upper digestive tract. Most scientists, however, do not understand the functional organization of the receptive fields and their physiological significance. The oral cavity, innervated by the $5^{th}$ cranial nerve (trigeminal), is designed to masticate, taste, and prepare the bolus for swallowing. The oropharynx, with the $9^{th}$ and $10^{th}$ nerve afferents, senses water temperature in relationship to thirst and controls saliva secretion to lubricate the bolus. The hypopharynx and upper third of the esophagus measure the temperature of the bolus and compare this to core body temperature. These afferents tell the brain how "hot" is the bolus of food or liquid. With a TRPM8 agonist, it is possible to convey signals via the hypopharyngeal and esophageal afferents to tell the brain that the center of the throat and chest is "cool." As a result, the organism feels comfortable, and these sensations counteract any disagreeable "hot" signals from the upper digestive tract.

The crucial targets for drug delivery are the TRPM8 nerve endings on the lumenal surfaces of the hypopharynx, the esophageal sphincter, and the upper third of the esophagus. The neuronal receptive fields of the target, the afferents of the $9^{th}$ [glossopharyngeal], $10^{th}$ [vagus], and spinal afferents, have an area of several $cm^2$. By contrast, surfaces of the oral cavity are at least 10× larger. Thus, a dispersed delivery system, such as chewing gum, will not work for whole body cooling sensations because the cooling agent is on the buccal cavity.

TRPM8 immunoreactive fibers are present in the pharynx but not on the epiglottis [Sato, T. et al. The distribution of transient receptor potential melastatin-8 in the rat soft palate, epiglottis, and pharynx. Cellular and Molecular Neurobiology, 33:161-5, 2013]. The hypopharynx, behind the larynx, reaches from the hyoid bone to the lower border of the cricoid cartilage. The pharynx is a continuous funnel-shaped inverted trapezoid tube [Daniel et al., 2007], and the total surface area is about 10 to 15 $cm^2$. The TRPM8 nerve endings are not present in the lower airway [Hondoh et al. (Brain Res. 1319:60-9, 2010)]. The neuronal cell bodies of the $10^{th}$ nerve are in the nodose ganglion (NG). The neuronal cell bodies of the $9^{th}$ nerve are in the jugular (JG) and petrosal ganglia (PG). Using an anti-sense method, Hondoh et al. found that TRPM8 cell bodies are in JG and PG, but not NG. By contrast, TRPA1-containing neurons are in all three ganglia. For the upper esophagus, the TRPM8 innervation is in the vagus and spinal afferents [Yu X et al. TRPM8 function and expression in vagal sensory neurons and afferent nerves innervating guinea pig esophagus]. Am J Physiol—Gastrointest Liver Physiol. 2015; 308(6):G489-96]. The targets for drug delivery are primarily the receptive fields of the $9^{th}$ and $10^{th}$ cranial nerves and the spinal afferents of the upper esophagus, but more caudal than the afferents in the oropharynx. The esophageal nociceptors [Ru et al. Adenosine-induced activation of esophageal nociceptors. Am J Physiol—Gastrointest Liver Physiol. 2011; 300 (3):485-93] and TRPM8 neuronal systems are distinct and not linked directly.

The presence of TRPM8 nerve endings in the rat tongue has been studied with antibody techniques. TRPM8 is in foliate papillae and less so in fungiform or circumvallate papillae. The cell bodies for these nerve endings are in trigeminal ganglia and not in neurons with other TRP channels such as TRPMV1 or TRPA1. The taste buds have no direct innervation, although the nerve endings are adjacent to these structures. Abe et al. concluded that TRPM8 in the tongue mediates coolness sensation but is not directly linked to taste (Abe J, Hosokawa H, et al. TRPM8 protein localization in trigeminal ganglion and taste papillae. Mol Brain Res. 2005; 13:91-8).

The topographical proximity of the cooling and nociceptive afferent systems is of considerable interest. In the esophagus, the cooling and the nociceptive receptors overlap in the upper third of the esophagus, but the afferent information is in separate sets of fibers. When the afferent signals reach the brain nuclei, the information integrates. The cooling system suppresses nociception. The esophagus is aligned posteriorly with the trachea. Thus, cooling signals from the esophagus at the levels of the cricoid cartilage, jugular notch, and manubrium can also suppress tracheal irritation.

Selection of TRPM8 Agonist for Delivery. Major categories of TRPM8 agonists are a) monoterpenoids, b) derivatives of p-menthane such as p-menthane carboxamides, p-menthane carboxyl esters, c) 1-dialkyl-phosphinoyl-alkanes (DIPA), and d) miscellaneous compounds such as icilin and others. A molecule's potency in an in vitro TRPM8 assay is only a general predictor of therapeutic activity. Efficacy depends more on formulation, delivery, and penetration.

An agonist is a chemical that activates biological events. If the agonist is topical, it can be delivered locally to the surface of the mucocutaneous junctions. The immediate onset of action matches the ease of topical administration. By contrast, antagonists require systemic absorption into the bloodstream and steady drug concentration at the receptor. The 1-dialkylphosphinoylalkane selected as the primary example is Cryosim-3 [C3, 1-diisopropylphosphinoyl-nonane, CAS Registry No. 1503744-37-8-7]. It produces robust, refreshing sensations on the surfaces of the ocular rim, oral and nasal cavity, pharynx, and anogenital surfaces at a dose of ~1 to 5 mg. It is selective for TRPM8 and does not activate TRPV1 and TRPA1-transfected cells. The use of a selected TRPM8 agonist is a promising strategy for relieving discomfort at mucocutaneous junctions. The unusual property of the DIPA molecules is water solubility and the ability to penetrate the cell layers of the skin to reach receptive targets underneath. The target for delivery is TRPM8. When activated, TRPM8 conveys the cooling sensations. Central integration of these signals relieves dysesthesia. By relieving dysesthesia, the DIPA also has a disease-modifying effect. The patient feels better and sleeps better. The water solubility of the DIPA at therapeutically effective concentrations facilitates the formulation of compounds for delivery to TRPM8.

Advantages of a Beverage Delivery System and the Beverage Volume

A beverage is a standard intake method and is acceptable if the imbibed liquid is palatable. However, the delivery of coolants by this method to the lining of the upper digestive tract is difficult because most coolants are not water-soluble. The swallowed liquids move in the blink of an eye from mouth to esophagus and then stomach. Pharyngeal Transit Time (PTT) is the time between the arrival of the bolus head at the fauces and the complete passage of the bolus tail through the upper esophageal sphincter. The average PTT time is ≤1 sec as measured by videofluoroscopy [for example, see Regueiro et al. Influence of Body Height on Oral and Pharyngeal Transit Time of a Liquid Bolus in Healthy Volunteers. Gastroenterol Res. 2018; 11(6):411-5]. The challenge of drug delivery is to retain a sensory agent on the target surface. The active ingredient cannot be delivered as fine solid particles, as that would cause irritation and elicit coughing, so ideally, an agent should be miscible in a liquid.

As contemplated here, the delivery process is to use a beverage to deliver a dissolved cooling agent onto the TRPM8 nerve endings of the hypopharynx and the upper third of the esophagus. The cooling action has an onset of action of less than three min and occurs in the center of the upper thorax. Cooling and relief of esophageal discomfort last for at least 30 min. The subject can drink on an "as needed" (p.r.n.) basis. The fast onset of action gives the patient a sense of cooling pleasure and relief from any throat and chest discomfort.

The beverage volume per unit drinking session can range from 15 mL (a shot of spirits such as whiskey or cognac) to 330 mL (a bottle of beer or soft drink). The intermediate volumes are, for example, a glass of wine or a cup of coffee. For a medicinal beverage, the volume can be as low as 5 mL (tsp) for a child or the elderly. The experiment found that the total adult dose of a DIPA per drinking session should be in the range of 15 to 35 mg. For example, effective doses were 15 mg of DIPA-1-8 in a whiskey glass or 33 mg of DIPA-1-9 in a standard beer bottle. For some lower molecular weight DIPA, such as DIPA-1-5 or DIPA-1-6, 10 mg in 15 mL was sufficient for a robust, immediate cooling response. The integrated cooling duration was better after drinking a larger beverage volume. The second delivery aspect was that the beverage had to be swallowed in a gulp or quaffed, e.g., in a 5 mL swallow, so the liquid quickly reaches the esophagus. Sipping or holding the liquid in the mouth reduced activity because the coolant remained in the oral cavity. The DIPA must reach receptors in the lower pharynx and esophagus for whole body cooling. Thus, the parameters for whole body cooling with a beverage are: choice of the active ingredient, the concentration of the ingredient in the beverage, imbibed volume, and method of drinking, namely to swallow and not sip.

As described in the Experiment Section, sweeteners (Tables 4) and specific plant extracts mask the bitter tastes of DIPA. One surprising finding was that familiar drinks such as Heineken beer or Schweppes tonic water modulate the unpleasant taste of DIPA solutions. The bitterness of DIPA was not additive or enhanced by the extracts of hops or *Cinchona* but masked. This taste-modulation of the cooling agent allowed the beer or tonic water to be palatable. Other surprising masking properties were in extracts of the apple plant, ginger plant (*Zingiber officinale*), guarana plant (*Paullina cupana*), *Stevia* leaf extract (*Stevia rebaudiana*), monk fruit (*Siraitia grosvenori*), Concord grapes (*Vitis labrusca*) and grapes of the Muscat family. These plant extracts have tastants to modulate the taste of cooling agents to make them palatable. Thus, common drinks at the supermarket such as Martinelli apple juice, Concord grape juice, Moscato d'Asti wine, Schweppes ginger ale, Reed's ginger beer, Fever Tree tonic water, Guarana antarctica, and drinks mixed with *Stevia* extracts or Monk Fruit extracts, can be imbibed with DIPA and impart a robust sense of coolness without refrigeration. The liquid can be hot coffee (75° C.) or warm beer (50° C.), yet the cooling sensation of DIPA is still maintained!

Utility of Cooling Agents in a Taste-Modulated Beverage

Beverages with DIPA may be consumer products or medicinal beverages. The beverage is administered orally and swallowed. Familiar beverages include coffee, tea, energy drinks, soft drinks and carbonates, juices, sports drinks, dairy and non-dairy plant drinks, waters, and alcoholic and non-alcoholic beer. The beverage industry faces a constant demand for innovation and competition. A novel addition will be a palatable beverage with a cooling action that lasts more than 15 minutes. For example, such a beverage will help individuals cope with hot weather. Also, a cooling drink that does not require refrigeration would conserve energy and reduce expenditures for air-conditioning.

A medicinal beverage treats a human or an animal (e.g., in veterinary applications) for a desired therapeutic effect. Examples of medicinal uses are inhibiting disease progression, alleviating symptoms, and curing the disorder. In addition, such treatments include reducing sensitivity, hypersensitization, desensitization phenomena, and prophylaxis. The term "treatment" encompasses patients who have not yet developed the disorder but are at risk of developing the disorder. For example, livestock such as cattle is susceptible to heat. Therefore, the treatment with DIPA may enable livestock to graze and produce more milk or meat.

A medicinal beverage that cools can be used to treat esophagitis, throat irritation, a sore throat, cough, heartburn, chest pain, epigastric pain, acid regurgitation, or inflammation and pain of esophageal tissues. The drug action is fast in onset and changes the body's perception of core temperature. Thus, it may be therapeutic for treating hot flashes in postmenopausal subjects. In another aspect of treatment, the active ingredient stimulates coolness receptors and produces signals that will prevent dysphagia, dyspepsia, a sense of bloat, belching, and hiccups. The medical embodiment may treat esophageal discomfort caused by reflux of stomach contents (e.g., gastroesophageal or laryngopharyngeal reflux) or by esophagitis. One embodiment treats belching, a sense of bloat, or globus. One embodiment treats throat irritation, heartburn, chest pain, epigastric pain, and angina. The treatment includes treatment of adverse effects of heat in livestock disorders.

Taste-Modulating Experiments

DIPA compounds dissolved in water have an unpleasant, bitter, and metallic taste. The goal of the experiments was to find an adjunct that would make the DIPA beverage palatable. The anatomic sites for bitterness (adverse taste) are primarily on the dorsal surface of the posterior one-third of the tongue. The coolness and refreshment areas are on the hypopharynx and the upper one-third of the esophagus (FIG. 1). These are two different anatomic sites. Sensations of coolness from the oral cavity and oropharynx are not the primary targets. The esophagus is in the center of the thorax. When its lumen feels "cool," this is like turning on the central air conditioner for the body. The goal of the beverage is to turn on this central air conditioning for at least 30 min and preferably longer without adverse tastes in the oral cavity. That is, the goal is to produce cool in the center of the chest but without bitter taste. A standard procedure was set. The cooling agent at various concentrations was made up to 50 mL with a liquid in a plastic cup (Flak Tek, Inc. South Carolina), beaker, whiskey glass, or bottle. For example, the final concentration of the coolant in the test solution may range from 0.1 to 0.5 mg/mL. The temperature of the liquid was measured and then swallowed. For example, 50 mL could be swallowed in five gulps or sipped. The duration of cooling in the throat and chest was recorded at various intervals until the cooling disappeared. The ranking of adverse taste was on a scale of 0 (no adverse taste), 1 (mild taste), 2 (moderate taste), or 3 (adverse taste). The value was for at least three trials per beverage.

Examples of test procedures and results. The usual method was to prepare a 2-mL vial containing a DIPA dissolved in water. The contents of the vial were added to beverages such as beer, soda drinks, fruit juice, coffee, tea, or water. A taste-modulating adjunct such as a sweetener can be in the 2-mL vial or present in the beverage. The drink is gulped at about 5 mL per swallow. The time and temperatures are noted. The onset of coolness in the center of the upper chest usually occurs within 3 min. For active compounds, this effect was pleasant and, depending on dose, could last for 10 minutes, an hour, or more. Gulping the liquid was important. When held in the mouth, the drink is cool and may have taste, but cooling in the center of the chest is reduced. Thus, sipping is not the correct method of drinking. Using these methods, a bottle of beer (e.g., ~330 mL containing 33 mg of DIPA-1-9), if drank in a leisurely setting for one hour, can provide comfortable body cooling for 3 hr. Similarly, a smaller bottle of carbonated soda water (e.g., 200 mL), containing 15 mg of DIPA-1-6 produced immediate cooling relief for 30 min for individuals, for example, taking a break from playing tennis in the heat. For pharmaceutical uses, a tinted bottle with 20 mg of DIPA-1-9 in 50 mL of water with Splenda's Monk Fruit dissolved in it would be palatable and relieve the discomforts of indigestion.

From these initial studies (Table 4 to 9), it is apparent that a cold carbonated liquid medium and an alkaloid from a plant (hops, *Cinchona* extract, or coffee) can mask the adverse tastes of DIPA. Further studies of extracts of plant extracts such as ginger, citrus fruits, apple, grape, orange, guarana, *Stevia*, monk's fruit extracts, tea, and cocoa expanded the list of good adjuncts. Some bitter ingredients that are candidates for taste-modulating are listed in the paper by Wooding et al. (Bitter taste receptors. Evol Med Public Heal. 2021; 9:431-47). The data here indicate that tannic acids in tea or soft drinks called colas do not effectively mask the adverse tastes of DIPA, but tonic water containing quinine is effective.

Reagents for Sweeteners. The sweeteners were from retail sources. Each packet of sweetener is usually set to be as sweet as 2 tsp of sugar, or a sucrose equivalent of 8 g. Excipients such as erythritol may be present in the packet. Thus, the sweetener in Sweet'N Low is saccharin, Equal contains aspartame, Splenda contains sucralose, and Splenda and Truvia are tradenames of companies that also produce packets of *Stevia* and Monk Fruit sweeteners. Other sweeteners from Lankanto, Nutrasweet, and Sweetleaf were also tested. Sucralose powder was from Bulk Supplements.com. Neotame was from MarkNature.com and Acesulfame-K from Prescribed for Life. A standard procedure was to test the DIPA at 0.4 mg/mL of water with a sweetener at a sucrose equivalent (SE %) of 8% or eight g/100 mL of water, followed by further diluting the sweetener (e.g., ×1/10, ×1/25).

For a given individual, the presumption is that cooling is somewhat subjective. Some individuals experience a greater or lesser cooling sensation than others. The cooling perception depends on the density of thermo-receptors in the upper digestive tract. Without being bound by any theory, the cooling trigger is the coolant's access to the hypopharyngeal and esophagus lining. The bitterness receptors in the posterior third of the tongue's dorsal surface should be avoided or modulated.

The cooling mechanism directly activates the nerve endings of the mammal body responsible for detecting cold. Tissue temperatures are not affected. The stimulation of cold receptors at nerve endings, in turn, stimulates the central nervous system, as activation of receptors transduces into a perceived signal. Without being bound by theory, the cooling agents are proposed to penetrate the mucosal cell layers to reach cold receptors. Cold perception results from depolarizing the nerve endings containing the cold (TRPM8) receptors.

EXPERIMENTAL RESULTS

Study 1

The goal of the experiments was to find a beverage that would be pleasant to drink and give a sense of cooling to the whole body. The unpleasant taste of the DIPA compounds was apparent when tested in water solutions (Table 5) and received the maximum adverse taste score of 3. Variables diminishing the level of negative tastes were a lower liquid temperature, sweetness, and carbonation. Trumbo, P. R. et al. (2021) discusses the variables that affect the sweet taste. Perspective: Measuring Sweetness in Foods, Beverages, and Diets: Toward Understanding the Role of Sweetness in Health. In Advances in Nutrition (Vol. 12, Issue 2, pp. 343-354). Oxford University Press. https://doi.org/10.1093/advances/nmaa151. Changing some of these parameters made it possible to make the DIPA compounds palatable.

Sweeteners. Sweeteners are a diverse group of chemicals. Their effectiveness as taste modulators were ranked as a) excellent, when off-tastes are barely detectable, b) very good, when off-tastes are slightly present but not considered objectionable, c) good, when off-tastes are present but tolerated, d) not effective, where there is inadequate modulation of taste, and e) poor, when the tastes are aversive. The effects of sweeteners are summarized in Table 4.

Sugar (cane or beet) was effective in completely suppressing the bitter taste of DIPA (Table 6) at concentrations of 10 to 15 g sugar/100 mL of liquid (10 to 15 degrees of Brix). This level, about 10 to 15% sugar solution, resembles levels in fruit juices and soda drinks. Natural sugars in this category are fructose, sucrose, glucose, and psicose, all in the D-isomeric forms.

tame [Chattopadhyay, D. et al. Artificial sweeteners—A review. J Food Sci Technol. 2014; 51(4):611-21] inhibited the off-tastes of DIPA. Aspartame with a lingering aftertaste was somewhat unpleasant, but neotame gave a pure sweet taste that completely masked the effects of DIPA. Thus neotame can be used for taste-modulation of DIPA. By contrast, the artificial sweetener, sucralose, a chlorinated sugar, was not very effective and had an adverse taste. Synthetic sweeteners with a sulfonamide group such as saccharin and acesulfame-K were ineffective and had severe off-tastes.

TABLE 4

Sweeteners as Taste-Modulators, Summary *

| Sweetener | Ingredient | Prepared at 100 mL | Ranking | Comment |
|---|---|---|---|---|
| Monk fruit extracts | glycosides, mogrosides | one packet~2 tsp sugar | excellent | ideal |
| Stevia extracts | Steviol glycosides | one packet~2 tsp sugar | excellent | ideal |
| peptide like | neotame, aspartame, | dissolved powder or one packet | excellent for neotame | ideal for neotame |
| sugar | sucrose | 10 to 15% wt/vol | very good | caloric and cariogenic |
| fruit juices | sugars | 10 to 15% wt/vol | vry good | caloric and carigoenic |
| chlorinated sugar | sucralose | one packet~2 tsp sugar | not effective | residual bad tastes |
| has sulfonamide group | saccharin acesulfame-K | one packet~2 tsp sugar | poor | conspicuous bad tastes |

*Solutions were swallowed at 15 to 50 mL per unit sessions.

Monk fruit extract and *Stevia* plant extract as sweet taste modulators of DIPA. Monk fruit (*Siraitia Grosvenor*), so-called because it is near Buddhist temples in Southeast Asia, is a fruit that contains glycosides with potent sweeteners. This sweetener is now available in USA supermarkets. *Stevia rebaudiana* is a shrub first discovered in South America, and its leaves have a strong sweet taste. The active ingredients of monk fruit and *Stevia* are called glycosides and are hundreds of times sweeter than sugar. Specifically, the glycosides for Monk Fruit are called mogrosides and the *Stevia* glycosides are called rebaudioside. The chemistry of these sweeteners is complex and consists of ent-kauran diterpenoids (*Stevia*) and cucurbitane triterpenoids (Monk Fruit) [Cicek S. Structure-Dependent Activity of Plant-Derived Sweeteners. *Molecules* 2020, 25(8), 1946, pg. 1-23, https://doi.org/10.3390/molecules25081946]. These sweeteners attract consumers who wish to avoid sugars and associated calorie risks. Moreover, these sweeteners do not support bacterial growth on teeth or cause plaque and dental decay.

The *Stevia* glycosides target taste receptors and TRPM5 receptors of the taste cells on the tongue (FIG. 5). TRPM5 and TRPM8 belong to the TRP melastatin family and have six transmembrane loops, and show regions of peptide homology. *Stevia* leaf extracts block the unpleasant tastes of DIPA. The association of *Stevia* with South America led us to examine guarana plant extracts made from the powdered seeds of the guarana berry (*Paullinia cupana*) found in Brazil's Amazon basin. Surprisingly, a guarana soft drink, Guarana Antarctica (Ambev), with its aroma, carbonation, and sugar, was exceptionally effective in suppressing the adverse tastes of DIPA.

The artificial sweeteners based on the dipeptidyl Aspartic Acid-Phenylalanine structure, such as aspartame and neo- Fruit Juices as taste modulators of DIPA. Fruit juices and fruit nectar are consumed worldwide (North America, Europe, and Asia-Pacific) at about 8 to 9 billion liters per year per region. In the USA, the flavors preferred by consumers are orange~apple>grape~strawberry>then mango, cherry, cranberry, lemon, peach, and watermelon. The sugar or carbohydrate content of juices is usually >10% wt/volume of the liquid [Li J, et al., Profiles of Sugar and Organic Acid of Fruit Juices: A Comparative Study and Implication for Authentication. J Food Qual. 2020]. Sugars in juices have the disadvantages of increasing calories and causing tooth decay. We found that grape juices with a robust taste and aroma and high sugar content, such as Concord grape juice (Welch), muscat grape juice, or wine (Moscato d'Asti), were very effective suppressants of the unpleasant tastes of DIPA (Table 8). Tart cherry juices were also effective. Standard apple juices (Martinelli or Mott's) were highly effective. Surprisingly, citrus juices such as orange and lemon were not very effective, despite their high sugar contents. The presence of fibers in citrus juices which can adsorb the DIPA compound may affect the effective concentration and reduce the cooling duration. Fibers can be filtered; however, it appears as if the citric acid acidity renders the DIPA less palatable. Cane sugar (sucrose) added 10% wt/vol to a solution of DIPA effectively suppressed the off-tastes (Table 6).

Study 2

Carbonated soda water and soda drinks. Carbonated soda water at icy cold temperatures suppressed the adverse tastes of DIPA. Despite a high sugar content of ~10% sugar, Cola drinks were ineffective (Table 8). Soft cola drinks did not mask the tastes of DIPA. Tonic water containing quinine (Schweppes tonic water and Fever-Tree tonic water) modulates the DIPA taste (Table 7). But quinine has a narrow margin of safety, so this alkaloid is not optimal.

Beers which are made with the taste of hops were, surprisingly, effective suppressors of the unpleasant taste of DIPA (Table 7). Both alcoholic and non-alcoholic beers suppress the adverse taste. The presence of alcohol in beer by volume of ~7% did not affect the beneficial effects of taste modulation. Surprisingly, the beer can be at room temperature or warmed to 55+° C., and the cooling actions of DIPA were still present!

Other Plant Extracts as Modulators. Japanese rice wine (sake) modulated the taste of DIPA. The warmth sensation of the alcohol in sake mixed with the robust cooling of DIPA in the esophagus. Ginger ale, ginger beer, or ginger syrup were exceptionally good taste modulators of DIPA (Table 7). Both alcoholic and non-alcoholic ginger liquids masked the adverse taste. Hot coffee diminished the unfavorable tastes but was not entirely adequate, even in the presence of sugars (Table 9). The taste of hot chocolate was negative.

TABLE 5

Range-Finding Studies with Water. DIPA-1-9 was added (20 mg) to 50 mL of beverage to reach a 0.4 mg/mL and test in various media. The desired endpoint was to find conditions for absence of Adverse Taste (scale = 0), and sufficient duration of cooling (≥30 min). Water alone resulted in adverse taste, but were modulated by sweeteners and carbonation.

| Beverage | Examples of brands used | Temp. (° C.) | Duration Cool (min) | Adverse taste (scale 0-3) |
|---|---|---|---|---|
| water | Crystal Geyser | 10 | 48 | 2 |
| water | Crystal Geyser | 25 | 42 | 3 |
| water | Crystal Geyser | 74 | 45 | 3 |
| water + herbal sweetener | +Stevia leaf | 8 | 40 | 0 |
| water + herbal sweetener | +Stevia leaf | 22 | 35 | 0 |
| water + herbal sweetener | +Stevia leaf | 72 | 32 | 0 |
| carbonated water | Perrier, La Croix | 8 | 45 | 1 |
| Water + synthetic sweetener | Neotame at 0.2 mg/mL | 10 | 40 | 0 |

Study 3

Effects of Heat on Cooling Actions of DIPA. Surprisingly, the heat of a hot beverage did not negate the cooling action of DIPA. For example, hot water (73° C.) and other warm liquids such as coffee and beer (55° C.) did not significantly affect the cooling actions of DIPA (Table 9).

Study 4

DIPA Cooling on the effects of a "hotpot" meal. A hotpot meal has been prevalent in central China (Sichuan province) for over a thousand years and has become very popular in many parts of Asia today. It is a family affair with a boiling pot of broth in the middle of the table, and everyone cooks food in the broth. Exceptionally spicy chili pepper is in the soup, and even in summer, the air-conditioning is off, so everybody sweats. The general idea is to get so hot that one becomes desensitized to the hot weather. The desensitization to heat is congruent with the studies of N. Jancso of Hungary, who first showed that ingested capsaicin permanently damages the nerve endings that detect heat. For those who cannot suffer the hotpot meal, drinking a beverage with DIPA-1-9 at 0.5 mg/mL in water containing 1 packet of Splenda's Monk Fruit sweetener per 200 mL relieves the pain in the oral cavity and throat. The relief has an onset within several minutes and the hot-cold sensations are invigorating. Another method for relief from the hotpot is to incorporate it into a beer at DIPA-1-9 0.1 mg/ml, and commercialize it as "HotPot Beer."

Study 5

Structure-Activity Relationships and Mechanisms of Action for Taste Modulation. The taste buds on the dorsal surface of the tongue sense bitter, sweet, sour, salty, and umami flavors (FIG. 6). Bitter, sweet, and umami tastants are detected by G-protein coupled receptors (GPCR) with 7-transmembrane domains located on specific taste receptor cells. TRPM4 and TRPM5 receptors are also present on taste receptor cells, and TRPM5 interacts with *Stevia* sweeteners, but the general function of TRP receptors in taste sensation is less clear. The active sensory ingredients of ginger interact with TRPV1, which is also present on the tongue [Roper, S. D. (2014). TRPs in taste and chemesthesis. In Handbook of Experimental Pharmacology (Vol. 223). https://doi.org/10.1007/978-3-319-05161-1 5]. The TRPM8 receptor is homologous to TRPM5 and TRPV1 (FIG. 5).

There is a good correlation between the potency of a DIPA TRPM8 agonist and the duration of cooling (Table 10). The fit of the DIPA into the agonist binding pocket is specific. Elongating the alkane chain from 9 to 10 carbons results in an immediate loss of bioactivity. Modulation of the cooling effects is effective from DIPA-1-5 to DIPA-1-9. Lengthening the carbon chain increases the duration of action. The results here show that certain sweeteners can effectively modulate the off-tastes of DIPA. Also, tastants from beer and ginger are effective modulating agents. The precise receptor interactions for taste modulation require further investigation. Sugars such as sucrose act directly with the orthosteric site on GPCR, but allosteric sites' nature and location are diverse.

TABLE 6

Dose-Response Studies of DIPA-1-9 and Sweeteners. The adverse tastes of DIPA-1-9 was suppressed at 0.4 mg/mL but not at 0.8 mg/mL by Stevia leaf extracts (Truvia). Sucrose 10% wt/vol suppressed the adverse taste of DIPA-1-9 but higher sucrose 15% was needed to suppress DIPA-1-9 at 0.8 mg/mL.

| 50 mL Beverage containing: | Temp. ° C. | Min. | Adverse Taste |
|---|---|---|---|
| DIPA-1-9 at 0.2 mg/mL + Stevia | 20 | 12 | 0 |
| DIPA-1-9 at 0.4 mg/mL + Stevia | 20 | 35 | 0 |
| DIPA-1-9 at 0.8 mg/mL + Stevia | 20 | 55 | 1 |
| DIPA-1-9 0.4 mg/mL + Sucrose (10%) | 20 | 42 | 0 |
| DIPA-1-9 at 0.8 mg/mL + Sucrose (10%) | 20 | 39 | 1 |
| DIPA-1-9 at 0.8 mg/mL + Sucrose (15%) | 20 | 45 | 0 |

Conclusions. With the proper choice of taste modulators, it is possible to prepare a beverage with attractive cooling properties without adverse taste. The cooling agent activates TRPM8 receptors in the hypopharynx-esophagus lining, acting like a mini-airconditioner for the center of the chest. As a result, the core temperature feels cool. Cooling occurs even when the temperature of the imbibed beverage is 50 to 75° C. Such a beverage has many novel recreational and medicinal applications. The exotic indigenous Monk fruit and *Stevia* plants may give allure to a drink for people from hot countries such as Southeast Asia and South America, respectively. They may even assuage the thirst of people in North America. Refrigeration of the drink is unnecessary as the chill is present without a low liquid temperature. The DIPA drink may, for example, aid firefighters and treat the hot flashes of menopause. A robust cooling drink that lasts for half an hour or more may reduce the need for air-conditioning and energy consumption on a hot day. Taste modulation allows the active ingredients to bypass the activation of bitterness receptors on the dorsal surface of the tongue and enable the active ingredient to reach the receptors for coolness in the pharynx and esophagus.

TABLE 7

DIPA-1-9 taste effects in beer, ginger drinks, and tonic water. DIPA-1-9 was added (1.5 mg) to 50 mL of beverage to 0.4 mg/L. The goal was to find conditions where Adverse Taste was absent (scale = 0), and sufficient duration. No sweeteners were added to these beverages. The results indicated that beer, ginger drinks, and tonic water with quinine diminished adverse tastes.

| Beverage | Examples | Temp. (° C.) | Duration (min) | Adverse Taste |
|---|---|---|---|---|
| non-alcoholic beer | Heineken 00 | 7 | 40 | 0 |
| beer | Heineken | 7 | 44 | 0 |
| wheat ale | Blue Moon | 9 | 35 | 0 |
| Sake (Japanese rice wine) | Hakutsurli (white goose) sake | 10 | 32 | 0 |
| ginger ale | Canada Dry | 11 | 25 | 1 |
| ginger beer, juice | Q beer, Suja | 9 | 40 | 0 |
| tonic water with quinine | Schweppes tonic water | 7 | 42 | 0 |

TABLE 8

DIPA-1-9 taste effects in beverages with high sweetness, having sucrose equivalents of ≥10% wt/vol. DIPA-1-9 was tested at 0.4 mg/L. No sweeteners were added to the test beverages. Apple and grape juices, wine, guarana juice soda were effective suppressants, but cola drinks and orange juice were not effective. Thus, sucrose or sugar sweetness by itself is not the sole determinant of taste modulation.

| Beverage | Examples | Temp. (° C.) | Duration (min) | Adverse Taste |
|---|---|---|---|---|
| apple juice | Martinelli, Mott's | 21 | 34 | 0 |
| grape juice | Welch Grape | 20 | 35 | 0 |
| wine | Moscato d'Asti | 8 | 36 | 0 |
| guarana juice soda | Guarana Antarctica | 10 | 40 | 0 |
| sweetened soda | Coca-Cola | 7 | 25 | 3 |
| orange juice | fresh-squeezed | 8 | 40 | 2 |

TABLE 9

DIPA-1-9 0.4 mg/mL tested in hot beverages. The coolness of DIPA-1-9 was present at liquid temperatures of 62 to 75° C. Adverse tastes were present in coffee beverages. Unsweetened tea did not modulate DIPA-1-9 but became palatable when sweeteners were added.

| Beverage | Examples | Temp. (° C.) | Duration (min) | Adverse Taste |
|---|---|---|---|---|
| hot water + monk fruit | Splenda monk fruit | 70 | 38 | 0 |
| hot water + monk fruit | Splenda monk fruit | 50 | 42 | 0 |
| hot coffee + herbal sweetener | 117 + Stevia extracts | 75 | 36 | 1 |
| hot coffee cream/sugar | 117, Nescafe | 65 | 35 | 1 |
| hot coffee-no cream or sugar | 117, Nescafe | 62 | 30 | 1 |
| hot cappuccino drink | 3 Coracoes, Brazil | 70 | 30 | 2 |
| iced cold cappuccino | Starbuck's frappaccino | 8 | 25 | 2 |
| unsweetened green tea | Ito En | 10 | 35 | 3 |
| sweetened tea | Ito En + Truvia or Monk's Fruit | 10 | 40 | 0 |
| sweetened tea | Ito En + 10% sucrose | 10 | 38 | 0 |
| red tea | Peach-Ceylon, no sweetener | 46 | 31 | 2 |

TABLE 10

Correlation of TRPM8 receptor agonist activity to cooling duration of agonist in beverage on throat. The test compounds were tested at 0.4 mg/mL in Monk fruit sweetened water (1 pack of Splenda Monk Fruit per 100 mL). The test volume was 30 mL. There was a general correlation of $EC_{50}$ to duration of cooling. The structural requirements were quite stringent, extending the alkane from 9 to 10 carbons led to complete loss of activity.

| Compound | $EC_{50}$ (μM) | 95% Confidence Interval | Relative Potency to menthol | Duration of Cooling (min) |
|---|---|---|---|---|
| DIPA-1-5 | 5.6 | 4.4 to 7.2 | 0.7 | 12 |
| DIPA-1-6 | 2.4 | 1.5 to 4.0 | 1.6 | 20 |
| DIPA-1-7 | 0.7 | 0.5 to 1.0 | 5.4 | 36 |
| DIPA-1-8 | 0.7 | 0.5 to 1.0 | 5.4 | 43 |
| DIPA-1-9 | 0.9 | 0.4 TO 2.5 | 4.0 | 48 |
| DIPA-1-10 | inactive | — | | 0 |

The invention claimed is:

1. A beverage comprising: a liquid, a 1-diisopropyl-phosphinoyl-nonane (DIPA-1-9), and neotame, wherein the neotame is present in the beverage at a concentration of 0.05 to 0.2 mg/mL.

2. The beverage of claim 1 wherein 1-diisopropyl-phosphinoyl-nonane (DIPA-1-9) is present in the beverage at a concentration of 0.01 to 1.0 mg/mL.

* * * * *